United States Patent [19]

Aoyagi

[11] Patent Number: 5,107,738
[45] Date of Patent: Apr. 28, 1992

[54] TWO-WAY BAND SAW MACHINE

[75] Inventor: Minoru Aoyagi, Hatano, Japan

[73] Assignee: Amada Company, Limited, Japan

[21] Appl. No.: 707,227

[22] Filed: May 24, 1991

Related U.S. Application Data

[60] Continuation of Ser. No. 369,525, Jun. 21, 1989, abandoned, which is a division of Ser. No. 79,998, Jul. 31, 1987, Pat. No. 4,854,208.

[30] Foreign Application Priority Data

Jul. 31, 1986 [JP] Japan .................. 61-180518

[51] Int. Cl.⁵ .................. B26D 1/54; B23D 53/06
[52] U.S. Cl. .................. 83/820; 83/801; 83/810; 83/827
[58] Field of Search .......... 83/795, 801, 810, 820, 83/813, 789, 821, 828, 794

[56] References Cited

U.S. PATENT DOCUMENTS

| | | | |
|---|---|---|---|
| 2,625,965 | 1/1953 | Crane | 83/820 X |
| 2,705,510 | 4/1955 | Stocke | 83/820 X |
| 2,774,131 | 12/1956 | Crane | 83/820 X |
| 2,782,811 | 2/1957 | Johnson | 83/820 |
| 2,827,085 | 3/1958 | Ocenasek | 83/810 X |
| 2,843,917 | 7/1958 | Crane et al. | 83/820 X |
| 2,914,100 | 11/1959 | Lindholm | 83/820 X |
| 3,587,378 | 6/1971 | Oppenheim | 83/801 |
| 3,801,089 | 4/1974 | Fukugami et al. | 83/820 X |
| 3,908,723 | 9/1975 | Hill | 83/789 X |
| 4,014,235 | 3/1977 | Fukami | 83/820 X |
| 4,625,603 | 12/1986 | Brink | 83/794 X |

Primary Examiner—Frank T. Yost
Assistant Examiner—Rinaldi Rada
Attorney, Agent, or Firm—Wigman & Cohen

[57] ABSTRACT

To cut a workpiece along two different cutting directions, the band saw teeth are set in a first vertical cutting direction by a band saw guide device and then the cutting head (CH) is moved frontward, for instance; thereafter, the band saw teeth are twisted toward a second vertical cutting direction by the same guide device and then the cutting head is moved to-and-fro, for instance. The machine is effectively usable in cutting off a test piece from a large workpiece. To improve the cutting precision, various novel devices are incorporated, such as a balance cylinder (B-CYL) for allowing the cutting head to move up and down smoothly; two back-and-forth cylinders (BF-CYL) for moving the cutting head back and forth in symmetrical pressure application; cutting head fix device (FD); a rigid guide column; band saw holding device (BSH); a slidable small-diameter driven wheel arranged within the cutting head (CH), etc.

4 Claims, 13 Drawing Sheets

TWO-WAY BAND SAW MACHINE

This is a continuation of co-pending application Ser. No. 07/369,525 filed on June 21, 1989 now abandoned, which in turn is a divisional application of Ser. No. 07/079,998 filed on July 31, 1987, which is now issued U.S. Pat. No. 4,854,208.

SUMMARY OF THE INVENTION

With these problems in mind, therefore, it is the primary object of the present invention to provide a two-way band saw machine which can cut off a workpiece along two cutting planes without setting a workpiece on a worktable twice.

To achieve the above-mentioned object, a two-way band saw machine having a worktable for mounting a workpiece thereon; a cutting head for supporting an endless band saws a guide column for supporting the cutting head; and a base for supporting the worktable and the guide column, according to the present invention, comprises: (a) means for selectively guiding part of endless band saw teeth toward a first cutting direction and a second cutting direction; (b) means for providing a first relative cutting motion between the cutting head and the worktable in the first cutting direction; and (c) means for providing a second relative cutting motion between the cutting head and the worktable in the second cutting direction.

The band saw guiding means comprises a pivotal body supported by the cutting head; guide blocks slidably arranged within the pivotal body so as to pinch the flat surface of the band saw; a hydraulic cylinder for actuating the pivotal body to the first and second cutting directions; and a hydraulic cylinder for locking the pivotal body to the cutting head.

When the cutting head is arranged extending in the horizontal direction, the two cutting directions are horizontal and vertical directions. In this case, the cutting head includes a lift housing moved up and down along the guide column and a band saw housing moved back and forth relative to the lift housing. so that the cutting head is movable in two directions relative to the fixed worktable.

To move the lift housing up and down, a balance hydraulic cylinder always operated at a constant pressure to support the lift housing is incorporated in addition to the lift hydraulic cylinder for mainly moving the lift housing up and down. The movable lift housing can be fixed to the guide column by cutting head fixing means.

To move the band saw housing back and forth relative to the lift housing, two back-and-forth cylinders are operated through a single master cylinder having two equivolume pressure chambers simultaneously by the same pressure.

To increase the rigidity of the guide column, a plurality of guide posts and link members are effectively connected. Further, it is preferable to provide the machine with band saw supporting means to facilitate removal and mounting of the band saw from or on the cutting head. To further facilitate the removal and mounting of the band saw, the band saw is reeved around a large drive wheel and a pair of small drive wheels at least one of which is slidably movable.

When the cutting head is arranged extending in the vertical direction, the first cutting direction is a back-and-forth direction and the second cutting direction is a right-and-left direction. The cutting head is moved relative to the worktable or the worktable is moved to the cutting head in either or both cutting directions.

In the two-way band saw machine according to the present invention a test piece can be cut off from a workpiece by setting the workpiece to the machine only once. When the workpiece is heavy, since the workpiece setting work is troublesome, the above-mentioned single workpiece setting work is very convenient.

DETAILED DESCRIPTION OF THE PREFERRED EMBODIMENTS

With reference to the attached drawings, a first embodiment (horizontal band saw machine) of the present invention will be described, in which a band saw is supported horizontally and a cutting head is moved up and down and back and forth relative to a worktable.

Figure 1A:
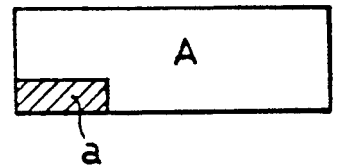
FIGS. 1(A) to (D) are illustrations for assistance in explaining the advantages of the two-way band saw machine according to the present invention.
Figure 1B:
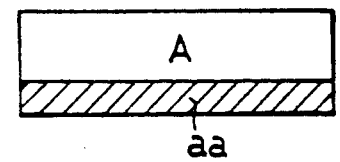
Figure 1C:
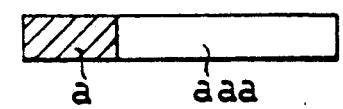
Figure 1D:
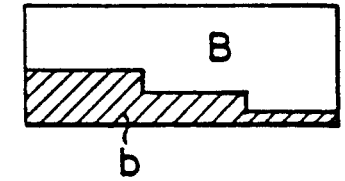
Figure 2A:
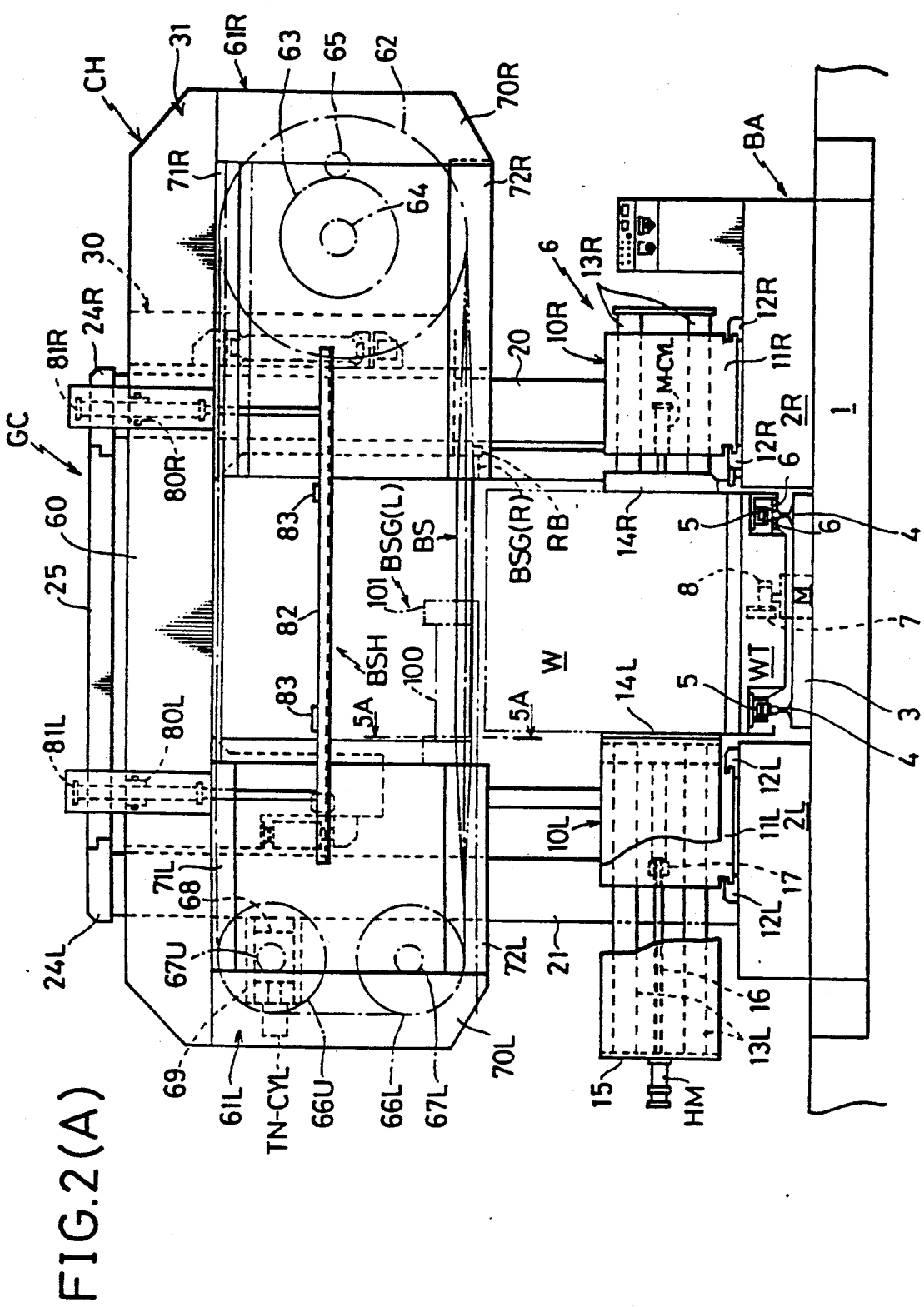
FIG. 2(A) is a front view showing a first (horizontal) two-way band saw machine according to the present invention.
Figure 2B:
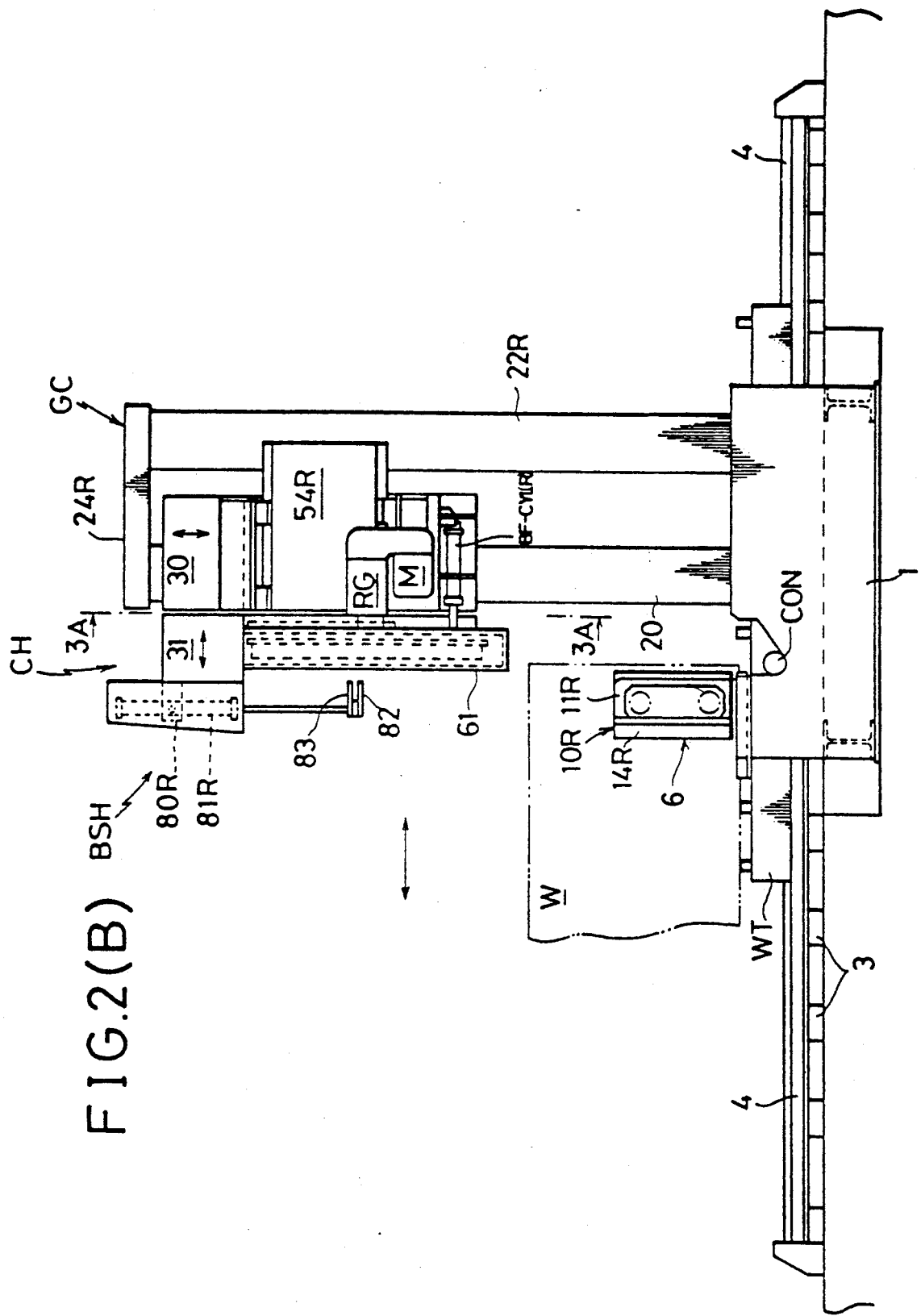
FIG. 2(B) is a side view of the same machine shown in FIG. 2(A)
Figure 2C:
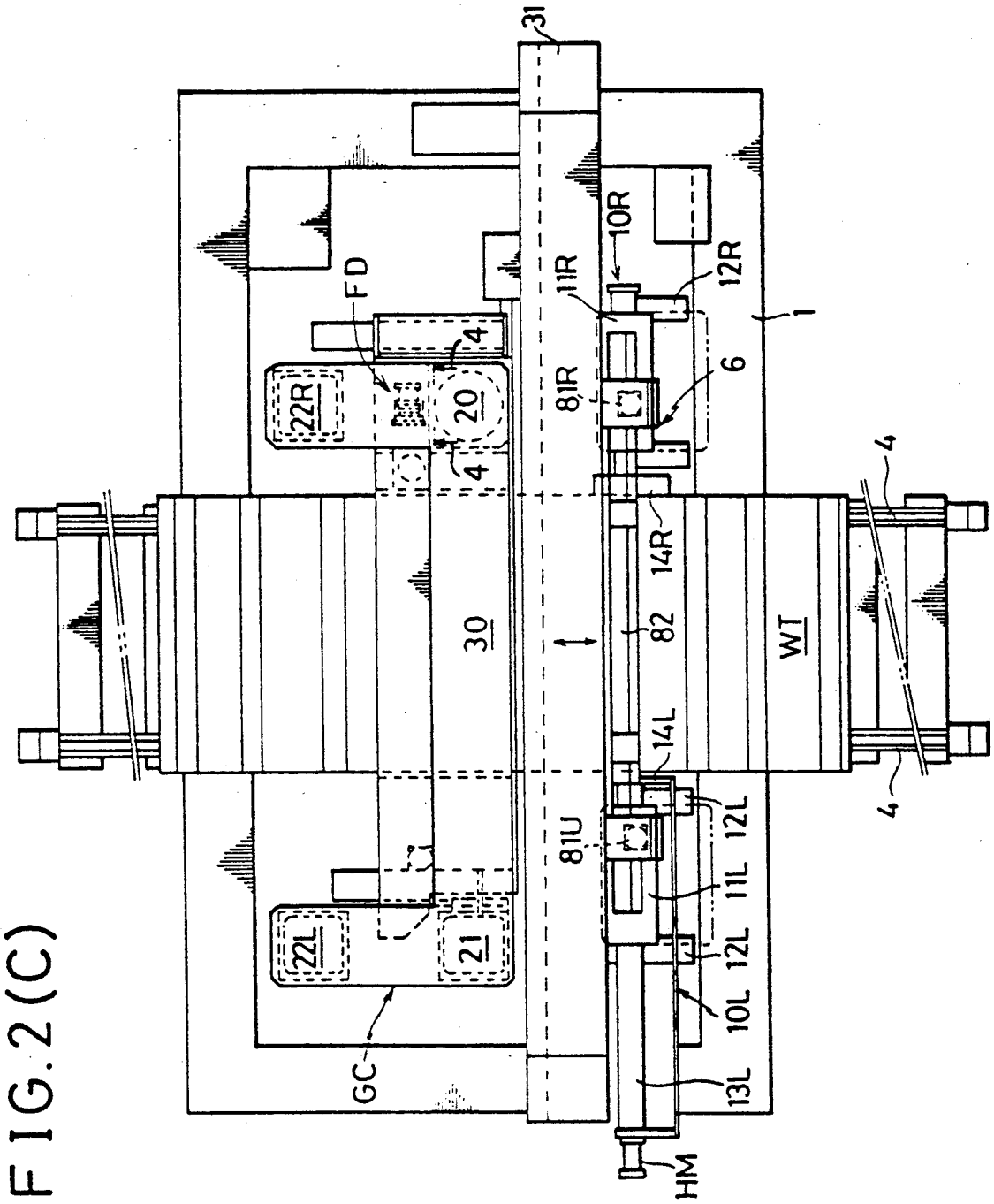
FIG. 2(C) is a top view of the same machine shown in FIG. 2(A)

FIG. 2(A) is a front view thereof; FIG. 2(B) is a side view thereof; and FIG. 2(C) is a top view thereof. The horizontal band saw machine is roughly made up of a base BA on which a worktable WT is mounted, a vice VI mounted on the base BA to vise a workpiece W mounted on the worktable WT; a cutting head CH for supporting an endless band saw BS horizontally; and a guide column GC for supporting the cutting head CH so as to be movable both in the vertical and horizontal directions.

To cut a workpiece W into a predetermined block, a workpiece W is mounted on the worktable WT and then vised by the vice VI. Thereafter, when the band saw BS is held in such a way that the teeth thereof is directed downward and the cutting head CH is lowered, the workpiece W is cut in the vertical cutting plane. On the other hand, when the band saw BS is held in such a way that the teeth thereof is directed frontward by twisting the band saw partially with a hydraulic cylinder, for instance and the cutting head CH is moved frontward, the workpiece W can be cut along the horizontal cutting plane.

The base BA includes a main base 1 formed by combining H-shaped steels or channel steels into a square shape, and a pair of right and left subbases 2R and 2L arranged on both the sides of the main base 1 so as to form a recessed space at the middle portion of the main base 1.

The worktable WT is made up of a plurality of sleepers (ties) 3 arranged within the recessed space on the main base 1 extending in the front-and-back direction, a pair of guide rails 4 arranged on the sleepers 3, a worktable WT slidably mounted on the rails 4 via wheels 5 rotatably engaged with the rails 4, a plurality of pinch rollers 6 for pinching the guide rails 5 to restrict the movement of the worktable WT in the right and left direction (perpendicular to the rails). In addition, a rack rod 7 is fixed to the inside of the worktable WT in parallel to the guide rails 4, and a pinion gear 8 driven by a servomotor M is in mesh with the rack rod 7. Therefore, when the pinion gear 8 is driven by the servomotor M, the worktable WT can be moved back and forth. Further, the position of the worktable WT can be detected by an appropriate position detector (not shown) and be positioned at a desired location by feedback control. The worktable WT is moved to locate a workpiece W mounted thereon at an appropriate cutting position.

The vice VI comprises a reference vice 10R slidably mounted on the right subbase 2R and a push vice 10L also slidably mounted on the left subbase 2L. These two vices are arranged so as to vise a workpiece W mounted on the worktable WT from both the sides thereof. The reference vice 10R includes a support slider 11R slidably engaged between two guide members 12R fixed on the right subbase 2R. The push vice 10L includes a support slider 11L slidably engaged between two guide members 12L fixed on the left subbase 2L. Although not shown, these two vices can be moved back and forth in synchronism with each other by an appropriate actuator such as rack-pinion mechanism, hydraulic cylinder, etc. to an appropriate position at which a workpiece on the worktable can be vised firmly.

To vise a workpiece mounted on the worktable WT, a pair of slide bars 13R are slidably passed through the support slider 11R horizontally, and a reference vice jaw 14R is fixed to the slide bars 13R. A pair of slide bars 13L are slidably passed through the support slider 11L, and a push vice jaw 14L is also fixed to the slide bars 13L.

To move the reference vice jaw 14R to and fro, a minicylinder M-CYL is disposed in the support slider 11R in such a way that a top end of a piston rod thereof is connected to the reference vice jaw 14R. On the other hand, to move the push vice jaw 14L to and fro, a hydraulic motor HM is fixed on a cover bracket 15 in such a way that one end of the screw rod 16 is connected to the hydraulic motor HM and the other end thereof is engaged with a nut member 17 fixed to the support slider 11L.

Therefore, when the minicylinder M-CYL is actuated or deactuated, the reference vice jaw 14R can be moved to and fro by the cylinder rod; and when the hydraulic motor HM is driven, the push vice jaw 14L can be moved to and fro via the screw rod 16 and the nut member 17. That is, a workpiece W can be vised by or released from these two vice jaws 14R, 14L. Further, both the support sliders 11R and 11L can be moved back and forth in synchronism with each other when a workpiece W is vised between the two, or independently when a workpiece W is not vised.

The guide column GC for supporting the cutting head CH comprises a cylindrical main guide post 20 vertically fixed on the right subbase 2R, a square subguide post 21 vertically fixed on the left subbase 2L, and two square rear posts 22R and 22L vertically disposed behind the main and subguide posts 20 and 21, respectively, as shown in FIG. 2(C).

Figure 3A:
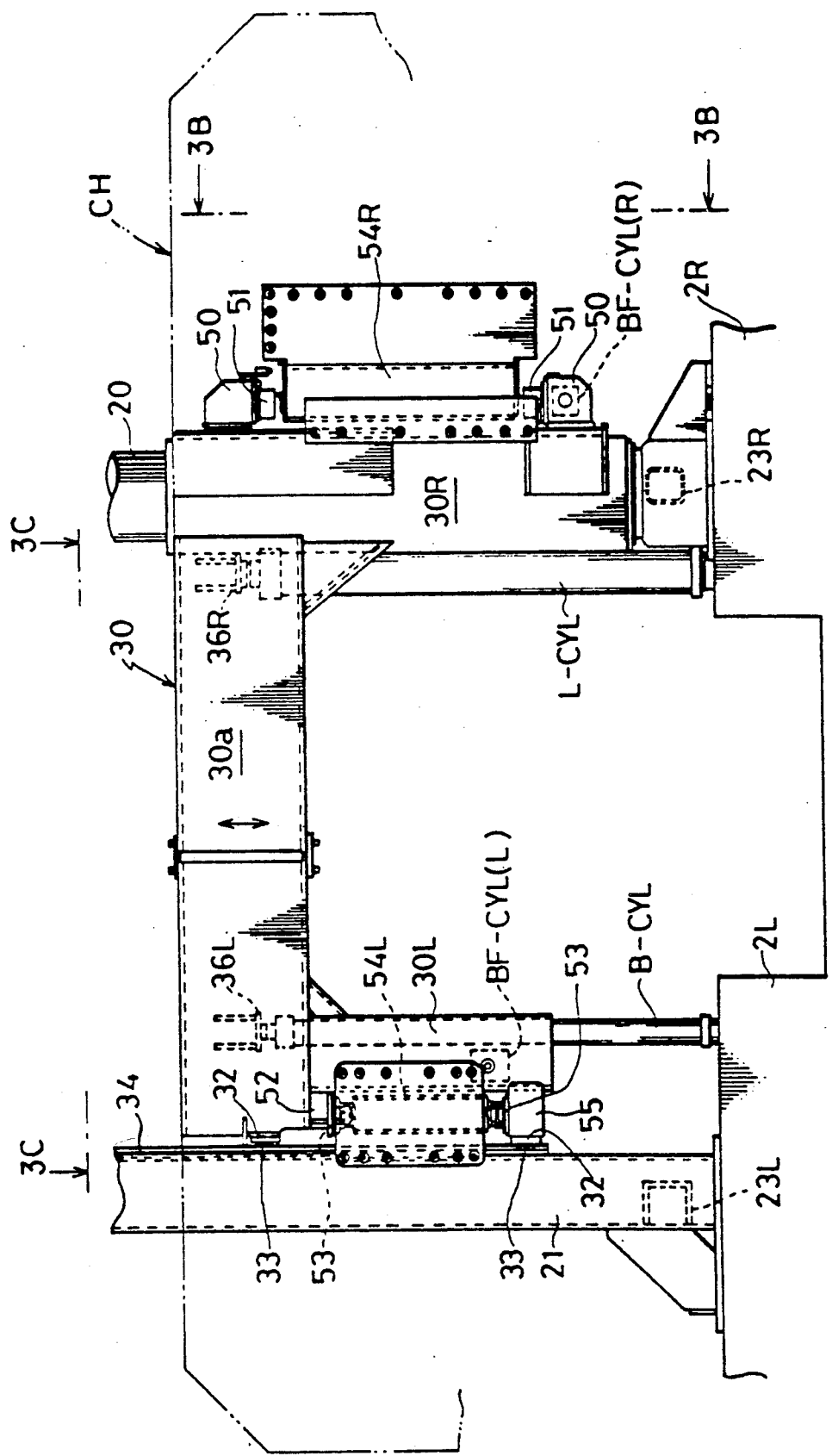
FIG. 3(A) is a front view showing the cutting head CH of the machine, seen from the line IIIA—IIIA shown in FIG. 2(B)

To further increase the rigidity of the guide column GC, as shown in FIG. 3(A), (B) and (C), a lower link member 23R is connected between the main guide post 20 and the rear post 22R; a lower link member 23L is connected between the subguide post 21 and the rear post 22L. In addition, as shown in FIG. 2(A) and 2(B), an upper link member 24R is connected between the main guide post 20 and the rear post 22R; an upper link member 24L is connected between the subguide post 21 and the rear post 22L.

Furthermore, an intermediate link member 25 is connected between the two upper link members 24R and 24L, as shown in FIG. 2(A).

In the above guide column construction, since the main guide post 20 and the subguide post 21 are reinforced by the rear posts 22R and 22L, even if the cutting head CH is moved back and forth and therefore a large moment is generated, it is possible to prevent bending of the main and subguide posts, thus allowing the cutting head CH to smoothly move up and down. Further, since the main and subguide posts 20 and 21 are connected by the intermediate link member 25, when the cutting head CH is unbalanced in weight in the right and left direction, it is possible to prevent bending of the main and subguide posts 20 and 21.

With reference to FIGS. 2(A) and (B), the cutting head CH for supporting a band saw BS comprises a lift housing 30 movable up and down being guided along the main guide post 20 and the subguide post 21 and a band saw housing 31 movable back and forth being supported by the lift housing 30.

In more detail, with reference to FIGS. 3(A) and (C), the lift housing 30 has right and left leg members 30R and 30L connected by a beam 30a. The right leg member 30R is fitted to the main guide post 20 movably up and down. The left leg portion 30L is positioned a little rightward from the leftmost end of the beam member 30a.

A guide bracket 54L is fixed to the left leg member 30L, and two roller brackets 32 are fixed to the leftmost end of the beam member 30a. A pair of guide rollers 33 are rotatably supported by each roller bracket 32 so as to pinch a vertical guide rail 34 fixed to the inside surface of the subguide post 21 from the front and back direction. Further, a vertical position sensor 35 (shown in FIG. 3C) such as a rotary encoder is mounted on the beam member 30a. This sensor 35 has a pinion driven by a rack rod 35a fixed to the subguide post 21 in parallel to the lift guide rail 34. Therefore, when the lift housing 30 is moved up and down along the main guide post 20 and the subguide post 21, the up-and-down position and the up-and-down movement speed of the lift housing 30 can be detected by the vertical position sensor 35.

To move the lift housing 30 up and down, a lift cylinder L-CYL is arranged near the main guide post 20, while a balance cylinder B-CYL is arranged near the subguide post 21, as depicted in FIG. 3(A). The base portion of the lift cylinder L-CYL is fixed to the subbase 2R, while the movable end portion thereof is linked to a bracket 36R fixed to the beam member 30a. The base portion of the balance cylinder B-CYL is fixed to the subbase 2L, while the movable end portion thereof is fixed to a bracket 36L fixed to the beam member 30a. This balance cylinder B-CYL serves to supports a moment of the lift housing 30 to allow the leg member 30R of the lift housing 30 to more smoothly move up and down along the main guide post 20. The diameter of this balance cylinder B-CYL is smaller than that of the lift cylinder L-CYL. The hydraulic pressure of the balance cylinder B-CYL is always kept constant so as to support a moment of the cutting head CH.

Therefore, when the lift cylinder L-CYL is operated, the lift housing 30 is moved up and down, and a moment of the lift housing 30 is supported by the balance cylinder B-CYL.

Figure 3B:
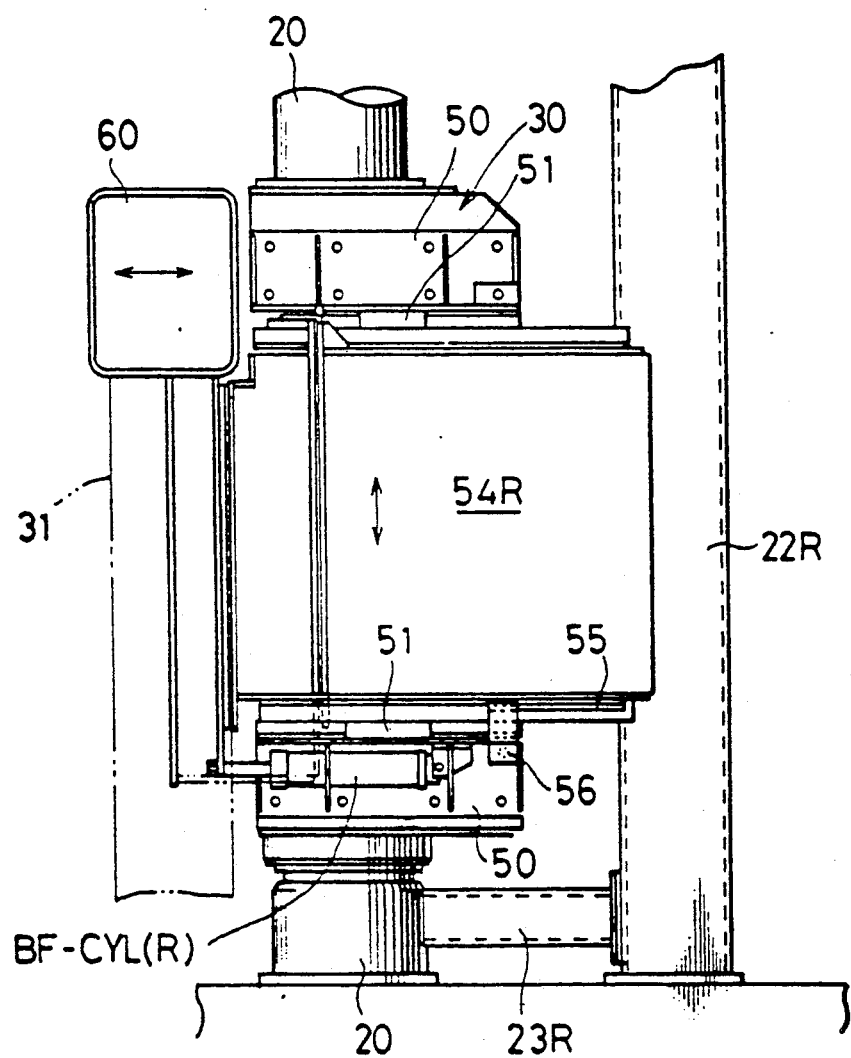
FIG. 3(B) is a side view showing the same cutting head CH of the machine, seen from the line IIIB—IIIB shown in FIG. 3A.
Figure 3C:
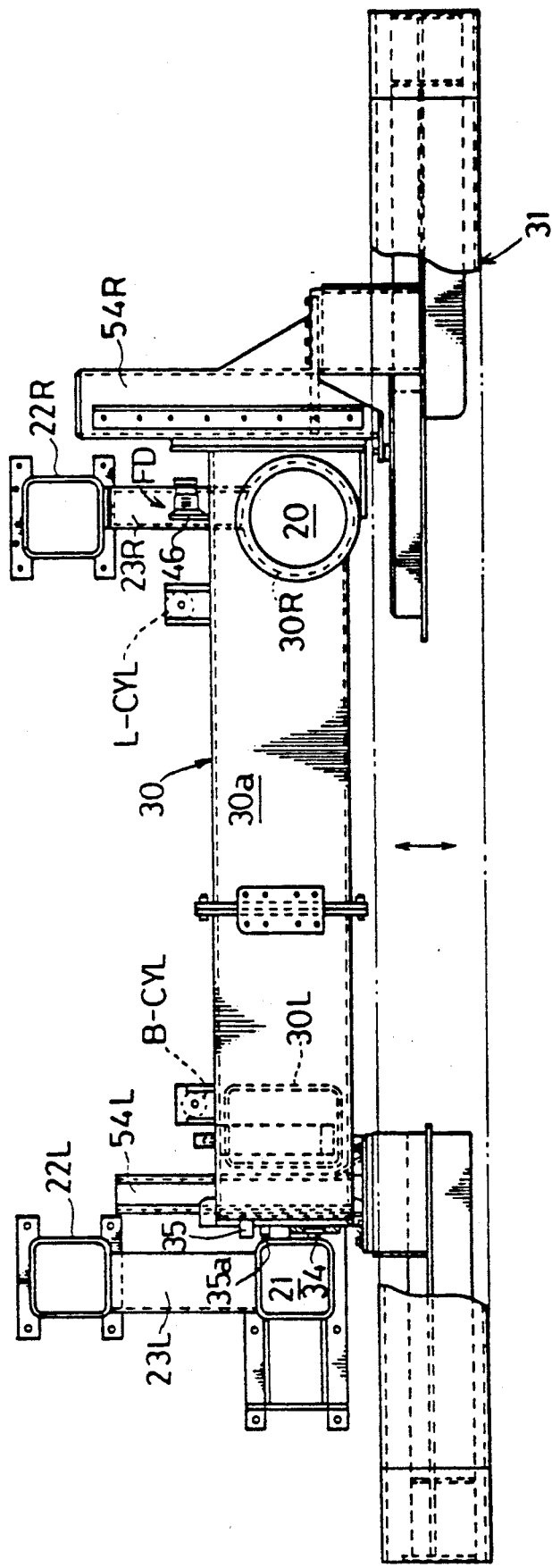
FIG. 3(C) is a top view showing the same cutting head CH of the machine, seen from the line IIIC—IIIC shown in FIG. 3(A)

To fixed the movable lift housing 30 at any given height, a lift housing fixing device FD is provided, as shown in FIGS. 2(C) and 3(C), between the guide column GC and the lift housing 30. In more detail, in FIG. 4, a clevis bracket 40 is fixed to the upper link member 24R connecting the main guide post 20 and the rear post 22R with bolts. A support member 41 made up of a plurality of band steel plates spaced by annular spacers 42 is fixed to this clevis bracket 40 with bolts and nuts. On the other hand, a U-shaped bracket 43 is fixed to the lower link member 23R also connecting the main guide post 20 and the rear post 22R with bolts. The lower portion of the support member 41 is connected to the U-shaped bracket 43 via annular spacers 44 and a tubular elastic member 45 such as urethane rubber.

To fix the lift housing 30 to the support member 41 by friction, a bracket 46 is fixed to the lift housing 30 so as to face the support member 41. A base block 47 is fixed to this bracket 46 with bolts. A pair of support leg members 47a are fixed to this base block 47, and a lift lock cylinder LO-CYL is mounted on this support member 41. A push block 48 is attached to an end of a piston rod 49 of the cylinder LO-CYL. A plurality of friction members FC intervene between the push block 48 and the support member 41 and between two support members 41 and between the support member 41 and the base block 47. These friction members FC are slidably supported within grooves formed in the support leg member 47a to restrict the vertical motion of the friction members FC.

When the lift lock cylinder LO-CYL is operated to strongly push the friction members FC and the support member 41 via the push block 48, since the friction members FC and the support members 41 are strongly pinched therebetween, the bracket 46 is friction locked to the support member 41. Therefore, the lift housing 30 is fixed to the support member 41 (i.e. the guide column) for safety when the lift cylinder L-CYL is in trouble, for instance.

Figure 4:
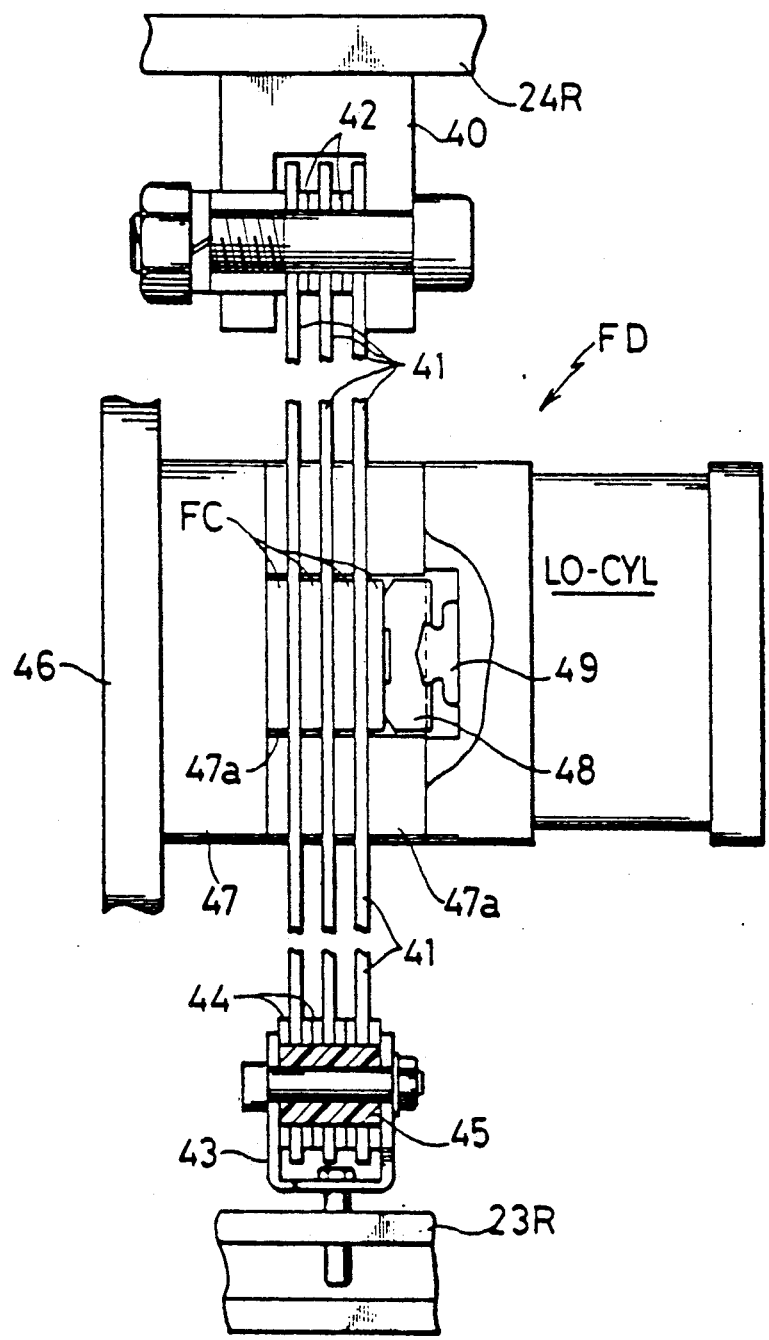
FIG. 4 is an enlarged bottom view of a lift housing fixing device FD of the machine, seen from the line IV—IV shown in FIG. 2(C)

Without being limited to the device shown in FIG. 4, various methods can be adopted. For instance, the lift housing 30 may be clamped directly, or an additional clamp post is provided for clamping operation only, or a wirerope or steel band is connected to the lift housing 30 so as to be clamped. To actuate the clamping device, hydraulic pressure or motor and gear mechanism can be used. In this case, friction force obtained by elastic members is utilized. The elastic members are released for clamping by actuating the device or urged for unclamping by deactuating the device or vice versa.

With reference to FIGS. 3(A), (B) and (C), to move the band saw housing 31 back-and-forth relative to the lift housing 30, a pair of back-and-forth cylinders BF-CYL(R) and (L) are provided.

As best shown in FIG. 3(B), a guide brackets 50 provided with a guide member 51 are disposed at both upper and lower portions of the leg member 30R of the lift housing 30. In the same way, as shown in FIG. 3(A) a guide bracket 52 provided with a guide member 53 is disposed on the upper portion of the leg member 30L of the lift housing 30, and a guide bracket 55 provided with a guide member 53 is disposed on the lower portion of the leg member 30L.

Further, a slide member 54R is located between the two upper and lower guide members 51 extending in the horizontal direction of the band saw housing 31. A slide member 54L is located between two upper and lower guide members 53 extending in the same horizontal direction.

Further, a back-and-forth cylinder BF-CYL(R) is disposed on the guide bracket 50, a back-and-forth cylinder BF-CYL(L) is disposed at the lower portion of the leg member 30L. Two piston rods, of these cylinders are in contact with the back surface of the band saw housing 31, and actuated in synchronism with each other.

To detect the position and the movement speed of the saw housing 31 in the back-and-forth direction, a rack rod 55 (FIG. 3B) is fixed to the slide member 54R so as to engage with a pinion gear of a position sensor 56 such as an encoder mounted on the guide bracket 50.

Therefore, when the back-and-forth cylinders BF-CYL(R) and (L) are operated, the band saw housing 31 is moved back and forth relative to lift housing 30. Further, the back-and-forth position and the movement speed is detected by the position sensor 56.

As shown in FIG. 2(A), the saw housing 31 is provided with a beam member 60 extending in a right and left direction and a pair of right and left wheel housings 61R and 61L of hollow box type as shown in FIG. 2(A). The slide members 54R and 54L are fixed to the rear walls of the wheel housings 61R and 61L, respectively. Top ends of the piston rods of the back-and-forth cylinders BF-CYL(R) and (L) are in contact with the rear walls of the wheel housings, respectively.

Within the wheel housing 61R, a large-diameter wheel 62 and a driven gear 63 are rotatably housed via a shaft 64 as shown in FIG. 2(A). This driven gear 63 is in mesh with a drive gear 65 driven by a motor M via a reduction gear RG shown in FIG. 2(B).

On the other hand, within the wheel housing 61L, two small-diameter wheels 66U and 66L are rotatably housed via shafts 67U and 67L. The upper shaft 67U is supported by a slide block 68 and the lower shaft 67L is supported by the rear plate of the wheel housing 61L. The slide block 68 is further slidably supported by a guide block 69. To slide the slide block 68 to and fro, a tension cylinder TN-CYL is mounted on the guide block 69 in such a way that an end of the piston rod of this cylinder is in contact with the slide block 68.

Therefore, after an endless band saw BS is reeved around the drive wheel 62 and the two driven wheels 66U and 66L, if the tension cylinder TN-CYL is operated to move the upper driven wheel 66U in the leftward direction in FIG. 2(A), an appropriate tension is applied to the band saw BS. Further, it is preferable to always urge the wheel 66U leftward by an elastic member.

As described above, since two small-diameter driven wheels 66U and 66L are arranged a distance away from each other, it is possible to reduce the longitudinal length of the saw housing 31 and therefore reduce the size and weight of the cutting head CH. Further, since the upper driven wheel 66U is slidable, the band saw BS can be loosened easily for providing an easy removal of the band saw from the saw housing 31.

To facilitate the replacement of the band saw, there are provided side openable cover 70R and 70L, upper openable covers 71R and 71L, and lower openable covers 72R and 72L are provided for the wheel housings 61R and 61L.

To further facilitate replacement of the band saw, a band saw holder BSH is provided for the band saw housing 31. In more detail, with reference to FIGS. 2(A) and 2(B), two support brackets 80R and 80L are fixed to the front surface of the beam member 60. Two saw suspending cylinders 81R and 81L are pivotally supported by two pins on the brackets 80R and 80L, respectively, as depicted in FIG. 2(B). A band saw support member 82 of L-shaped cross section extending in the right and left direction is supported by two piston rods of the two cylinders 81R and 81L, so as to support the upper straight portion of the endless band saw BS between the drive wheel 62 and two driven wheels 66U and 66L. Further, two band saw holding plates 83 are mounted at the lower end of the support member 2.

To set the endless band saw BS to the wheels, the upper portion of the endless band saw is put on the holding plate 83 and the lower portion thereof is set to the drive wheel 62 and the lower driven wheel 66L. Thereafter, the two saw suspending cylinders 81R and 81L are operated simultaneously to lift the holding plate 83 to the upper position in flush with the upper portion of the driven wheel 66U, and then the support member 82 is pivoted backward toward the wheels 62 and 66U to put the band saw on these two wheels. To remove the band saw BS from the wheels, the above procedure is reversed. Therefore, even if the band saw is large and heavy, it is possible to easily mount or remove the band saw.

To guide the band saw BS into two, vertical and horizontal position, the wheel housings 61R and 61L are provided with two band saw guide devices BSG(R) and (L), respectively. The righthand guide device BSG (R) is fixed to lower portion of the righthand wheel housing 61R. The lefthand guide device BSG(L) is slidably supported by the lefthand wheel housing 61L so as to be adjustable according to the width of a workpiece W to be cut. Further, a rotary brush RB is rotatably attached to the righthand band saw guide device BSG(R) to remove chip from the band saw BS. This brush RB is driven by a drive wheel 62 in conventional way. Further, chip removed by the brush is fed out by a conveyer CON shown in FIG. 2(B).

The lefthand band saw guide device BSG(L) will be described in detail with reference to FIGS. 5(A), (B) and (C) The device BSG(L) includes a movable arm 100 and a box-shaped guide housing 101 fixed to the arm 100 with bolts. As shown in FIG. 5(B), the guide housing 101 is formed with a circular arc-shaped opening 101A(R) and a circular arc-shaped groove 101B concentrically to the opening 101B at the lower portion of a right side plate thereof. Further, the guide housing 101 is formed with a circular arc-shaped opening 101A(L) at the lower portion of a left side plate thereof. At this opening 101A(L), a circular arc-shaped guide member 102 formed with a circular arc-shaped guide groove 101B(L) is fixed. A pivotal body PB is engaged with these two grooves 101B(R) and (L) as depicted in FIG. 5(B).

Figure 5A:
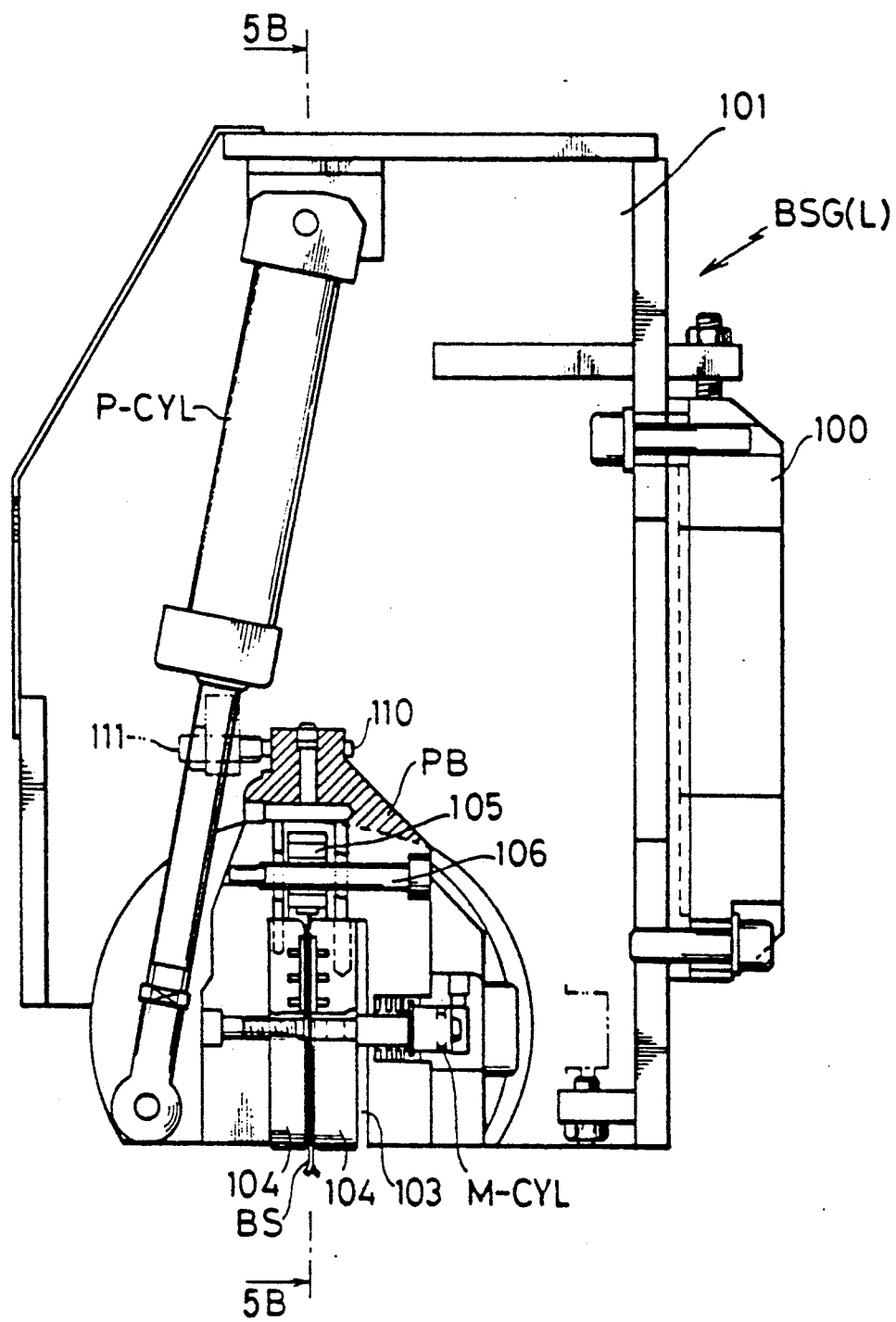
FIG. 5(A) is an enlarged side view showing a left-hand band saw guide device BSG(L), seen from the line VA—VA shown in FIG. 2(A)
Figure 5B:
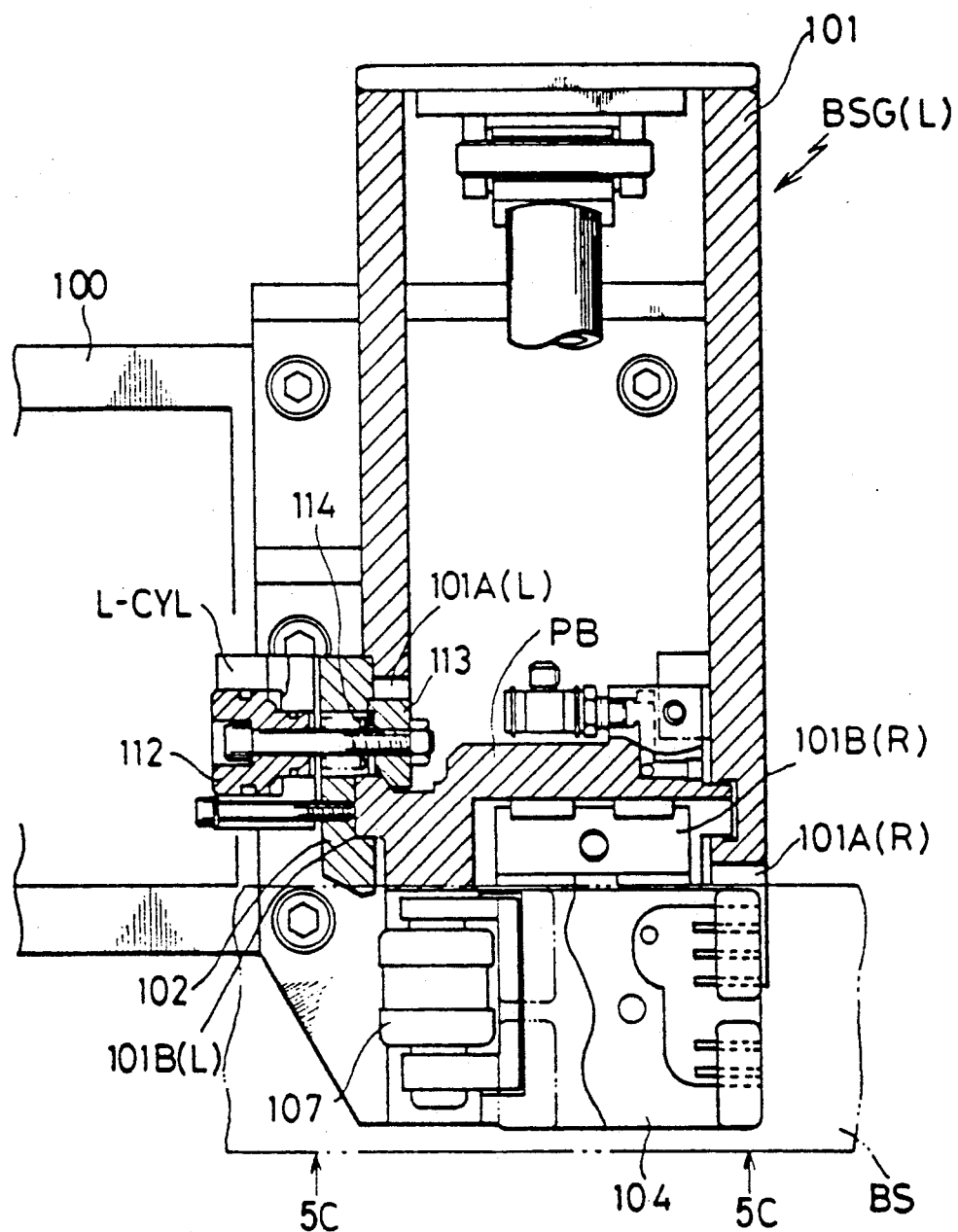
FIG. 5(B) is an enlarged front, partially cross-sectional view showing the same guide device BSG(L), taken along the line VB—VB shown in FIG. 5(A)

As shown in FIG. 5(A), this pivotal body PB is formed with a groove 103 to which the band saw BS is inserted. Within this groove 103, two guide blocks 104 are opposingly disposed to pinch the band saw BS when pushed against each other by a minicylinder M-CYL. Further, within the groove 103, a back support block 105 for supporting the rear side of the band saw 11 is mounted via a pin 106.

Figure 5C:
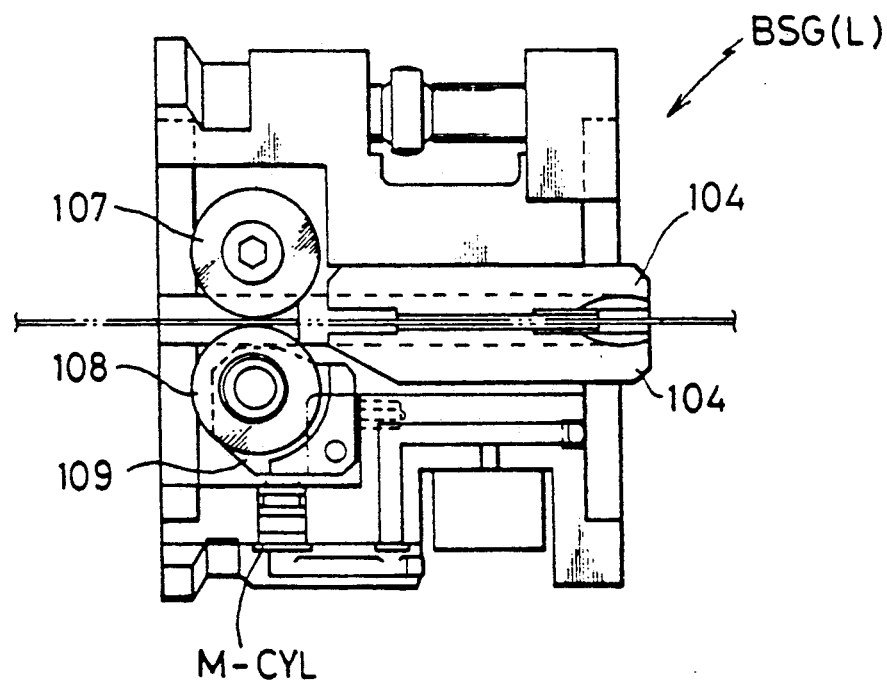
FIG. 5(C) is a bottom view showing the same guide device BSG(L), seen from the line VC—VC shown in FIG. 5(B)

Further, as shown in FIG. 5(C), a pair of pinch rollers 107 and 108 are disposed to pinch the band saw BS. The roller 108 is rotatably supported by a pivotal bracket 109 supported by a pin. This pivotal bracket 109 is urged toward the roller 107 by a minicylinder M-CYL mounted on the pivotal body PB.

As described above, the band saw BS is supported by the rollers 107 and 108 and the guide blocks 104 on both the flat sides and by the block 105 on the back side.

To direct the band saw BS in the vertical and horizontal directions, a pivotal cylinder P-CYL is connected to the pivotal body PB. The base portion of this cylinder is linked to the guide housing 101 and the piston rod thereof is linked to the pivotal body PB.

To restrict the pivotal position of the pivotal body PB, a stopper pin 110 is fixed to the top of the pivotal body PB so as to be brought into contact with stopper bolts 111 (only one is shown) fixed to brackets fixed to the guide housing 101 for pivotal position adjustment.

To lock the pivoted pivotal body PB, a lock cylinder L-CYL (FIG. 5B) is disposed on the guide member 102. A piston 112 of this cylinder is linked with a pinch member 113 with a bolt. A spring 114 is disposed between the piston 112 and the pinch member 113 to unlock the pivotal body PB.

Therefore, when the pivotal cylinder P-CYL is operated, the pivotal body PB is pivoted by a right angle to direct the tooth portion of the band saw toward the vertical or horizontal direction. Thereafter, when the lock cylinder L-CYL is operated, the pivotal body PB is fixed between the pinch member 113 and the guide member 102.

In place of the pivotal cylinder p-CYL, it is of course possible to incorporate a motor and gear mechanism or other.

The construction of the righthand band saw guide device BSG(R) is almost the same as that of the abovementioned lefthand band saw guide device BSG(L) except the pivotal body, the description thereof being omitted herein.

Figure 6:
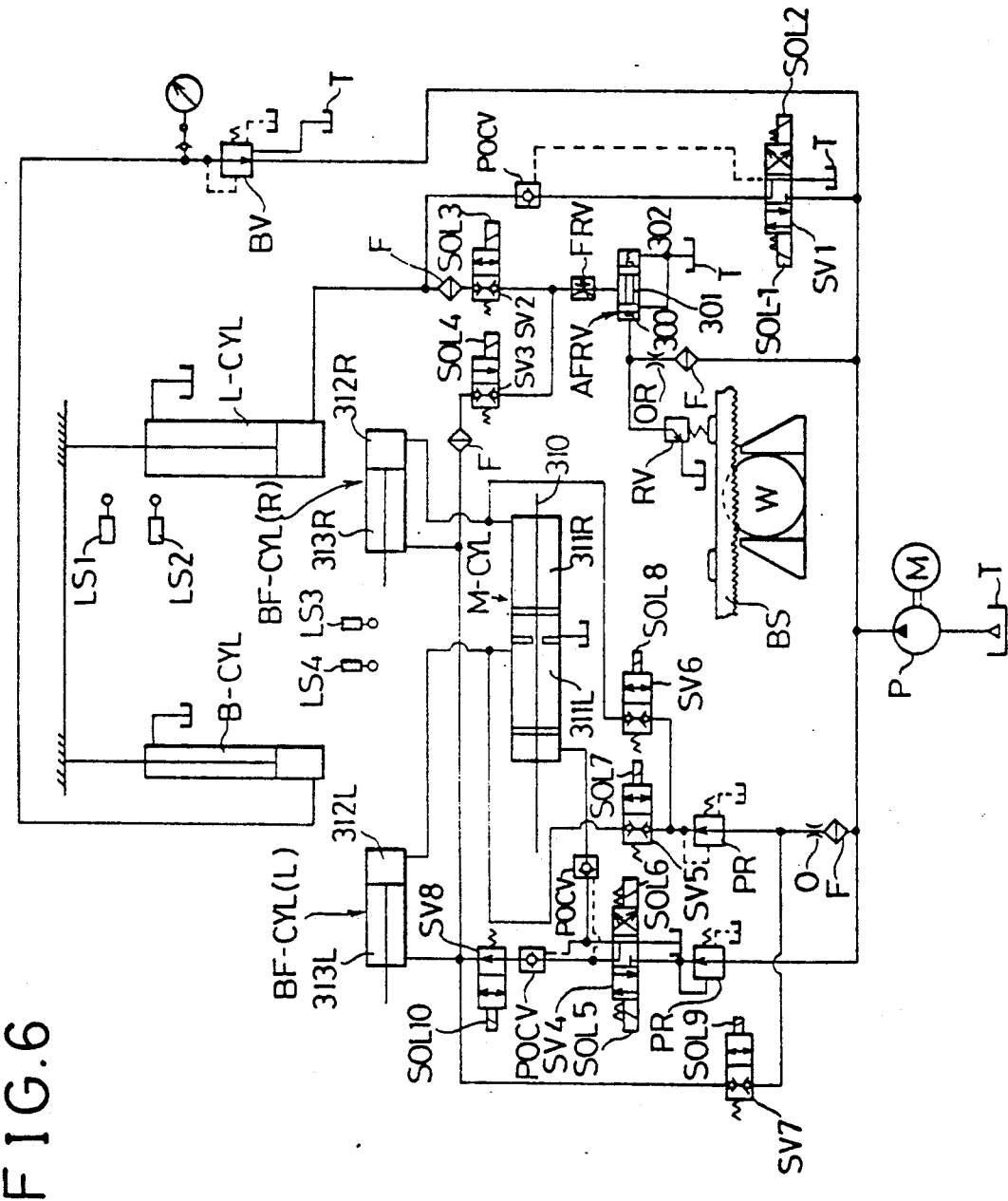
FIG. 6 is a hydraulic circuit diagram for operating a lift cylinder and two back-and-forth cylinders incorporated in the machine shown in FIG. 2(A), (B) and (C)

FIG. 6 shows a hydraulic circuit for controlling the lift cylinder L-CYL, the balance cylinder B-CYL, and two back-and-forth cylinders BF-CYL(R) and (L).

When a solenoid SOL1 of the first solenoid valve SV1 is energized, hydraulic pressure is supplied from a pump P driven by a motor M to the lift cylinder L-CYL via a pilot operated check valve POCV through to raise the cutting head CH. Simultaneously, hydraulic pressure is supplied to the balance cylinder B-CYL via a balance valve BV to raise the cutting head CH. When the cutting head CH moves upward and actuates an upper limit switch LS1 on the guide column GC, the solenoid SOL1 of the first solenoid valve SV1 is deenergized to neutralize the first solenoid valve SV1, so that the cutting head CH stops moving.

Thereafter, when a solenoid SOL2 of the first solenoid valve SV1 is energized, the pressure within the lift cylinder L-CYL is released by the weight thereof, so that the cutting head CH comes down.

During the down-movement of the cutting head CH, the pressure within the balance cylinder B-CYL rises because the weight of the cutting head CH is applied to the cylinder B-CYL. However, this pressure is released to a tank T via a balance valve BV.

When the cutting head CH comes down and therefore the band saw BS approaches the workpiece W to a position at which cutting immediately starts, a lower limit switch LS2 is actuated to deenergize the second solenoid SOL2, so that the first solenoid SV1 is neutralized.

Further, when the lower limit switch LS2 is actuated, a third solenoid SOL3 of a second solenoid valve SV2 is switched to energization. Therefore, pressure within the lift cylinder L-CYL is discharged into the tank T via two control valves FRV and AFRV. That is, the discharge rate of oil from the lift cylinder L-CYL is controller through a flow rate control valve FRV and an automatic flow rate control valve AFRV to control the downward speed of the cutting head CH or band saw cutting speed.

Under control of the cutting speed, in case cutting speed increases or a back force component applied to the band saw increases excessively due to abrasion of saw, a relief valve RV tends to be closed, so that pressure within a lefthand chamber 300 of the automatic flow rate control valve AFRV rises to push a spool 301 against a balance spring 302. Therefore, the automatic flow rate control valve AFRV decreases the flow rate, so that the lowering speed of the cutting head CH decreases to prevent bending or breakage of the band saw BS. When the back force component of the saw decreases, since the spool 301 is returned by the spring 302, the opening rate of the valve AFRV is returned to the normal state, and therefore the lowering speed of the cutting head CH is controlled by the valve FRV.

To move the cutting head CH frontward, the back-and-forth cylinders BF-CYL(R) and (L) are operated. For doing this, when a solenoid SOL6 of a fourth solenoid valve SV4 is energized, hydraulic pressure is supplied from the pump P to a master cylinder M-CYL via a pilot operated check valve POCV, so that a piston rod 310 is moved rightward in FIG. 6. Therefore, pressure within two chamber 311R or 311L is supplied to the first pressure chamber 312R or 312L of the two back-and-forth cylinders BF-CYL(R) and (L), respectively, so that two cylinders moves the saw housing frontward in synchronism with each other.

When the saw housing SH moves frontward, and therefore the band saw BS approaches the workpiece W to a position at which cutting immediately starts, a back limit switch LS3 is actuated to switch the solenoid valve SV8 to a closed state. Further, a solenoid SOL4 of a third solenoid valve SV3 is energized into an open state. Therefore, the further frontward movement of the saw housing SH is controlled by the flow rate control valve FRV and the automatic flow rate control valve AFRV in the same way as when the saw housing SH is lowered. That is, the cutting speed of the band saw moving in the horizontal direction can be controlled.

As described above, when the saw housing SH moves frontward, the workpiece W can be cut horizontally. When the saw housing SH moves to a stroke end, the limit switch LS4 is actuated. When this limit switch LS4 is actuated, the third solenoid valve SV3 is switched into a closed state; a solenoid SOL5 of the fourth solenoid valve SV4 is energized; and the solenoid valve SV8 is returned to an open state. Therefore, hydraulic pressure of the pump P is supplied to the second pressure chambers 313R and 313L to return the saw housing to the original position. When the saw housing is returned, a limit switch (not shown) is actuated to neutralize the forth solenoid valve SV4.

Further, it is possible to replenish the hydraulic pressure of the first pressure chambers 312R and 312L of the two back-and-forth cylinders BF-CYL(R) and (L), by energizing a solenoid SOL8 of the sixth solenoid valve SV6 and a solenoid SOL7 of fifth solenoid valve SV5 to open the valves. Further, it is possible to lock the saw housing SW at the rearward position by increasing the pressure applied to the second pressure chambers 313R and 313L of the back-and-forth cylinders BF-CYL(R) and (L) by energizing a solenoid SOL9 of the seventh valve SV7. For doing this, the seventh solenoid valve SV7 is energized open.

Further, in FIG. 6, POCV denotes a pilot operated check valve; F denotes a filter; 0 denotes an orifice; PR denotes a pressure regulator.

In operation of the two-way band saw machine, a workpiece W is first placed on a worktable WT. In this case, the worktable WT can be adjusted in the front and back direction by moving the worktable WT along the guide rails 4. After the worktable WT is located at an appropriate position, the workpiece WT is vised by the vice VI movable also in the front and back direction.

After the workpiece W has been vised, the band saw teeth are directed frontward by actuating the band saw guide and the cutting head CH is moved frontward to a predetermined position and then moved backward to complete the first cutting operation. Thereafter, the band saw teeth are directed downward by actuating the band saw guide and the cutting head CH is moved downward to a predetermined height to complete the second cutting operation.

Figure 7A:
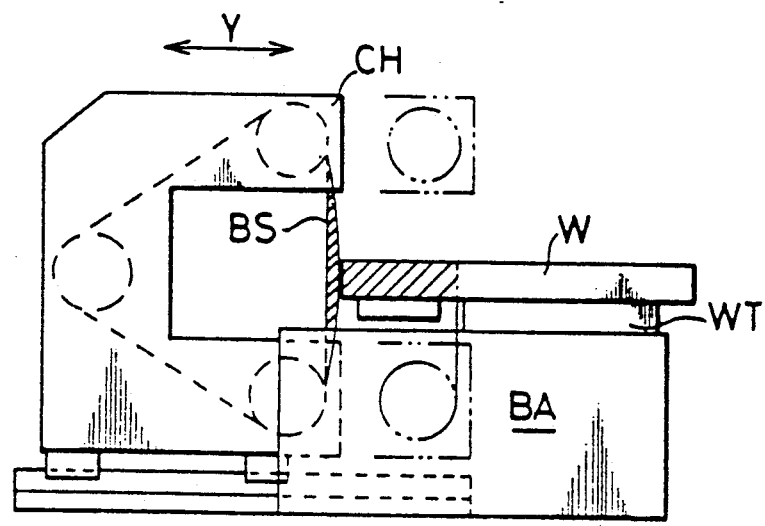
FIG. 7(A) is a diagrammatical side view showing a second (vertical) two-way band saw machine according to the present invention.
Figure 7B:
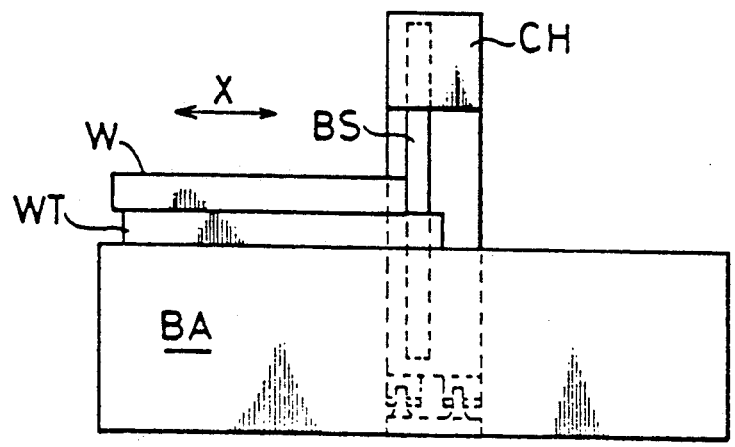
FIG. 7(B) is a diagrammatical front view showing the same machine shown in FIG. 7(A).

FIGS. 7(A) and 7(B) shows a second embodiment (vertical band saw machine) of the present invention. In this embodiment, the cutting head CH is arranged vertically so as to be movable back and forth, and the worktable WT is movable to and fro. Although not shown, the band saw BS can be directed toward two intersecting directions by an appropriate pivotal body such as that illustrated in FIGS. 5(A) through 5(C).

When the band saw BS is twisted at a right angle as shown in FIG. 7(A) and the cutting head CH is moved back and forth relative to a fixed workpiece W, the workpiece W is cut in the transversal direction of the base BA; while when the band saw BS is not twisted as shown in FIG. 7(B) and the workpiece W mounted on a worktable WT is moved in the longitudinal direction of the base BA relative to a fixed cutting head CH, the workpiece W is cut in the longitudinal direction of the base BA. This vertical type is convenient when a plate workpiece W is required to be cut into a square or rectangular shape.

Without being limited to the above embodiments, the cutting head is moved relative to the worktable or the worktable is moved to the cutting head in either or both cutting directions.

In the two-way band saw machine according to the present invention, since the band saw teeth are selectively guided toward first and second cutting directions, it is possible to cut off a test piece from a workpiece by two continuous cutting operations, after the workpiece has once been set to the machine, thus reducing the number of workpiece setting works which are troublesome when the workpiece is heavy.

What is claimed is:

1. A two-way band saw machine comprising:
   (a) a worktable (WT) for mounting a workpiece (W) thereon;
   (b) a base (BA) for supporting the worktable;
   (c) a cutting head (CH) for vertically supporting an endless band saw (BS) having teeth and a flat profile with the teeth formed at an edge thereof;
   (d) means (BSG) for selectively twisting part of the endless band saw teeth to direct said part of the endless bandsaw teeth toward a first vertical cutting direction and toward a second vertical cutting direction which is perpendicular to the first cutting direction said band saw teeth twisting means (BSG) including
   a pivotal body (PB) pivotally supported by the cutting head (CH),
   a pair of guide blocks (104) slidably arranged within the pivotal body so as to pinch a flat surface of the band saw (BS), and
   means (P-CYL) comprising a piston and cylinder for fluidically actuating said pivotal body (PB) to direct part of the endless band saw teeth toward the first and second cutting directions,
   wherein said band saw teeth twisting means fluidically maintains part of said band saw in either of said first or second directions, as selected;
   (e) means for moving the cutting head back and forth relative to the worktable; and
   (f) means for moving the worktable in a transverse direction relative to the cutting head;
   wherein the cutting head (CH) is arranged so as to be movable back and forth relative to the worktable when the part of the endless band saw teeth is directed toward the first cutting direction; and the worktable (WT) is arranged so as to be movable to and fro in the transverse direction relative to the cutting head direction of motion when the part of the endless band saw is directed in the second cutting direction.

2. The two-way band saw machine as set forth in claim 1, wherein said selective band saw twisting means (BSG) further comprises
   (a) a pivotal body (PB) pivotally supported by the cutting head (CH);
   (b) a pair of guide blocks (104) slidably arranged within the pivotal body so as to pinch a flat surface of the band saw (BS);
   (c) means (P-CYL) for actuating said pivotal body (PB) to direct part of endless band saw teeth toward the first and second cutting directions; and
   (d) means (L-CYL) for locking said actuated pivotal body to the cutting head at the first or second cutting position.

3. The two-way band saw machine as set forth in claim 2, wherein said selective band saw twisting means (BSG) further comprises a pair of pinch rollers (107, 108) for pinching the band saw, one of the rollers being pivotally supported by said pivotal body (PB) and urged against the other roller with the band saw pinched therebetween.

4. The two-way band saw machine as set forth in claim 1, wherein said selective band saw twisting means (BSG) is provided with means for adjustably sliding said twisting means (BSG) along a longitudinal direction of the endless band saw.

* * * * *